(No Model.)
6 Sheets—Sheet 1.

H. GALOPIN.
APPARATUS FOR USING LIQUID FUEL FOR LIGHTING OR HEATING.

No. 509,076. Patented Nov. 21, 1893.

WITNESSES:
J.B. Bolton
A.J. Underhill

INVENTOR
Henri Galopin
BY
[signature]
ATTORNEYS

THE NATIONAL LITHOGRAPHING COMPANY,
WASHINGTON, D. C.

(No Model.)

H. GALOPIN.
APPARATUS FOR USING LIQUID FUEL FOR LIGHTING OR HEATING.

Patented Nov. 21, 1893.

WITNESSES:

INVENTOR
Henri Galopin
BY
ATTORNEYS

(No Model.) 6 Sheets—Sheet 3.

H. GALOPIN.
APPARATUS FOR USING LIQUID FUEL FOR LIGHTING OR HEATING.

No. 509,076. Patented Nov. 21, 1893.

(No Model.) 6 Sheets—Sheet 4.

H. GALOPIN.
APPARATUS FOR USING LIQUID FUEL FOR LIGHTING OR HEATING.

No. 509,076. Patented Nov. 21, 1893.

WITNESSES:

INVENTOR
Henri Galopin
BY
ATTORNEYS

(No Model.)

H. GALOPIN.

APPARATUS FOR USING LIQUID FUEL FOR LIGHTING OR HEATING.

No. 509,076. Patented Nov. 21, 1893.

(No Model.) 6 Sheets—Sheet 6.

H. GALOPIN.
APPARATUS FOR USING LIQUID FUEL FOR LIGHTING OR HEATING.

No. 509,076. Patented Nov. 21, 1893.

WITNESSES:
E. B. Bolton
A. J. Underhill

INVENTOR
Henri Galopin
BY
ATTORNEYS

UNITED STATES PATENT OFFICE.

HENRI GALOPIN, OF MELBOURNE, VICTORIA.

APPARATUS FOR USING LIQUID FUEL FOR LIGHTING OR HEATING.

SPECIFICATION forming part of Letters Patent No. 509,076, dated November 21, 1893.

Application filed November 25, 1892. Serial No. 453,036. (No model.)

*To all whom it may concern:*

Be it known that I, HENRI GALOPIN, a subject of the Queen of Great Britain, and a resident of Temple Court Place, Chancery Lane, Melbourne, in the British Colony of Victoria, have invented certain new and useful Improvements in and Connected with Apparatus for Using Liquid Fuel for Lighting or Heating Purposes, of which the following is a specification.

This invention consists of certain improvements upon an invention entitled "improvements in and connected with apparatus for regulating the supply of liquid hydrocarbon to lamp and other burners in houses, railway carriages and other structures," for which I filed an application for United States Letters Patent, dated the 10th day of December, 1891, and serially numbered 414,607. In the specification of that invention I described a system of distributing liquid fuel to the lamp and other burners throughout a building, or elsewhere, from a reservoir supported in some convenient position at a higher level than any of the burners to be supplied, and I described the use of certain automatic valves for regulating the flow of liquid fuel from the supply pipes to the burners in the lamps, chandeliers, brackets or stoves to be maintained.

Now, my invention consists in certain improvements in the apparatus which I then described, and its object is to simplify such apparatus, and at the same time to render it more convenient and effective for the purposes required.

Referring to the accompanying drawings, Fig. 2$^a$ is a cross section of the screw-threaded spindle shown in Fig. 2. Fig. 4 is a side elevation of nearly the whole of a chandelier, embodying certain improvements which I have devised. Fig. 8$^a$ is a detail view of the upper part of Fig. 8. Fig. 13 is a side elevation, and Fig. 14 a vertical central section of a burner adapted for use on either a bracket or other lamp or chandelier. Fig. 15 is a horizontal section on line 15—15, Fig. 14. Fig. 16$^a$ is a sectional view of the valve fitted in the lower part of said chandelier illustrating a modification thereof. Fig. 17$^a$ is a sectional elevation of part of the apparatus therein shown.

A (Fig. 1) represents a kerosene tin or reservoir which is to be connected to the main supply pipe of the service, while *a* represents a screwed piece to which said end may be connected by a union coupling or otherwise. Within this screwed connecting piece *a* is a piece of thin tin, $a'$, or other material that can readily be pierced through as hereinafter described.

Figures 1, 2, 3, 5, 6, 7, 9, 10:
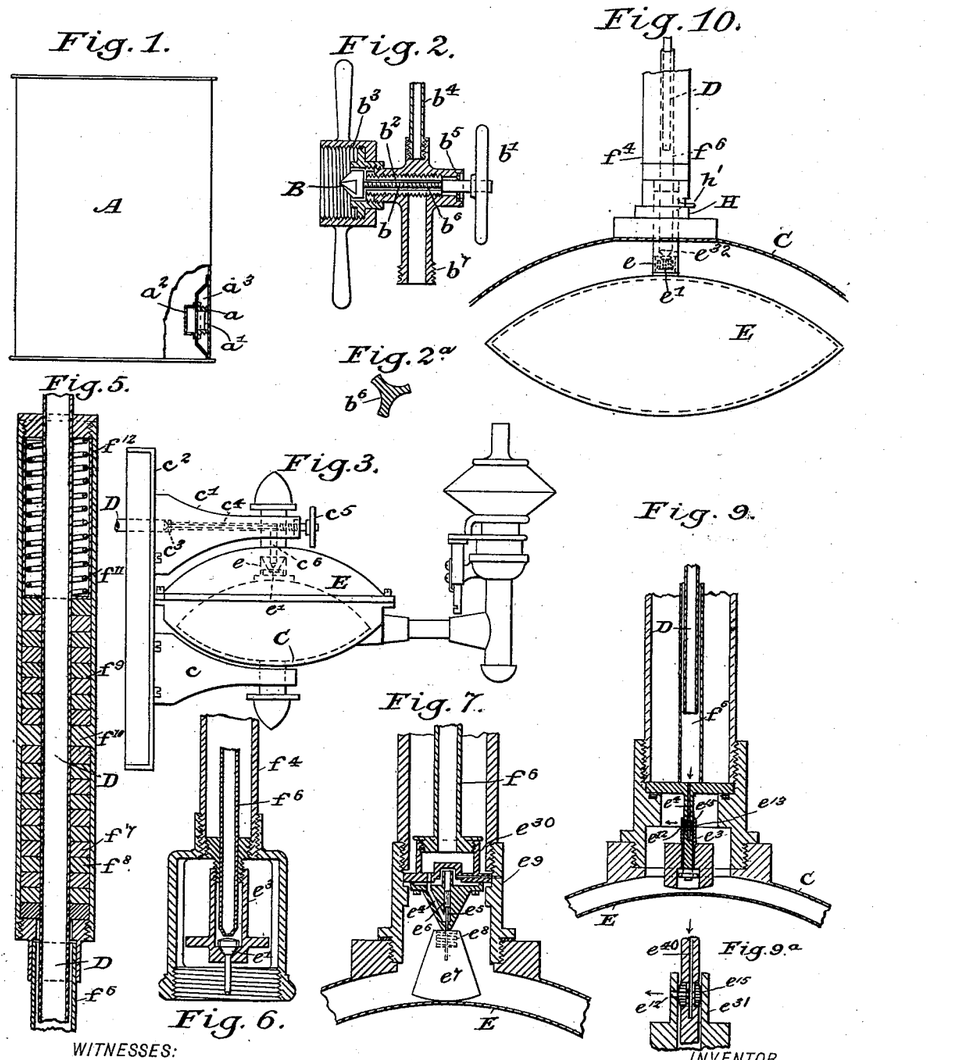
Figure 1 is a side elevation, shown partly in section, of a kerosene tin or reservoir with the screwed coupling piece let into a recess in the side thereof.
Fig. 2 is a central section of the valve which is fitted on the upper end of the main supply pipe to enable the oil reservoir to be readily connected to it.
Fig. 3 is a side elevation of a bracket lamp, which I have devised for use with my system of distributing liquid fuel to lamp and other burners.
Fig. 5 is a vertical central section of a stuffing box which I use for making a tight joint around the main fixed pipe of the chandelier.
Fig. 6 is a vertical central section of the lower end of the inlet tube of the chandelier, showing a valve adapted to enable said tube to be closed or opened by hand.
Figs. 7 to 12 are vertical central sections of various modified forms of the valves used for automatically opening or closing the end of the supply tube of the chandelier.

$a^2$ represents a piece of wire gauze or other material placed over the inside of the screwed connecting piece, $a$, which latter, instead of being allowed to project from the side of the tin or reservoir, A, is let into a recess, $a^3$, formed in the side thereof, as illustrated, the object being to enable the tins to be packed closer together and thus save space, and at the same time protect the screwed connecting piece $a$ from injury.

In order that the kerosene tin or reservoir shown in Fig. 1 may be readily connected to the end of the main service pipe in such a way as to admit air into such tin or reservoir without having to make an air hole therein, I have devised the apparatus illustrated in Fig. 2, consisting of a pointed screw-threaded spindle, $b$, provided with a small handle or wheel, $b'$, and passing through a casing, $b^2$, adapted to be connected by means of a coupling, $b^3$, with the screw-threaded piece, $a$, in the tin or reservoir, A. The forward end of this screw-threaded spindle is pointed, as illustrated at B, and the casing, $b^2$, is provided with an air tube, $b^4$, extending up to above the level of the top of the tin or reservoir A.

$b^5$ represents a washer (preferably of leather soaked in beeswax) to insure a tight joint being made around the rear end of the spindle, $b$, when the point B has been forced through the thin plate, $a'$, in the side of the tin or reservoir, A. The spindle, $b$, is formed with three or more grooves or flats, $b^6$, along it from end to end, as illustrated in cross-section at Fig. 2$^a$, the effect being to allow air to pass from the air tube, $b^4$, along the uppermost of the grooves or flats in said spindle, and thus into the tin or reservoir, A, at the same time that the liquid fuel in said tin or reservoir is allowed to pass therefrom along the lower of said grooves or passages into the main service pipe (which is connected to $b^7$) whereby it will be conducted to the various lamp and other burners throughout the building. The pointed end, B, of this screw-threaded spindle is made triangular, square or otherwise sided in order that openings or spaces may be left between said sides and the round hole formed by it in the thin sheet, $a'$, in the side of the tin or reservoir, A.

Referring to Fig. 3, C represents the reservoir of a bracket lamp which is supported between two brackets, $c$—$c'$, secured to and projecting from a wall-plate, $c^2$, or other convenient support. The uppermost bracket, $c'$, is fitted with a stop valve, $c^3$, whereby the port or passage leading from the supply pipe D may be opened or closed at will, the spindle, $c^4$, of said valve being screw-threaded at one end, as illustrated, and provided with a small thumbscrew or hand wheel, $c^5$, whereby it may be rotated in order to operate the valve, $c^3$. A short length of pipe, $c^6$, leads down from the passage through which the spindle, $c^4$, passes into the reservoir C, the lower end of said pipe being reduced in size and being provided with a small hole which can be automatically opened or closed according to the height of liquid in said reservoir by a float, E, fitted with a valve consisting of a cup, $e$, in which is a block of composition, $e'$, made of glycerine and glue so arranged as that when the float, E, rises it will contact with the lower end of tube, $c^6$, and thus close the opening therein. This block can, if preferred, be incased in a small piece of oilskin so as to preserve its form in hot weather.

Figures 4, 8A:
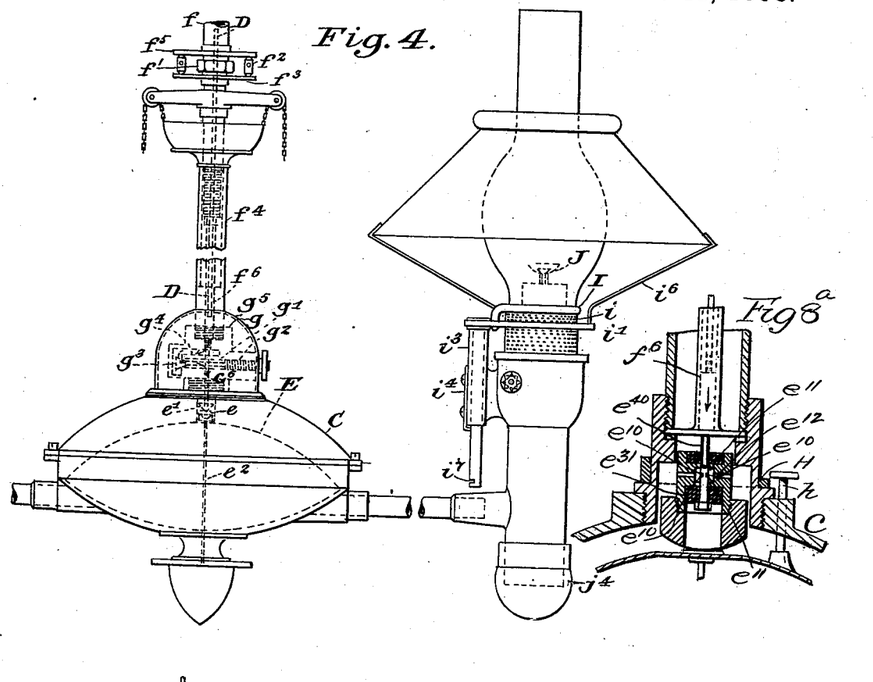

Referring to Fig. 4, D represents a pipe leading from the main service pipe to conduct the liquid fuel into the reservoir, C, while $f$ represents a sleeve encircling the upper part of the tube, D, and to which the chandelier is hung by means of a union coupling, $f'$. In order that the chandelier may be adjusted into its horizontal position, I screw studs, $f^2$, into a flange, $f^3$, on the upper end of the main sleeve or outer tube, $f^4$, of the chandelier so that the upper ends of said screwed studs bear against the under side of a flange, $f^5$, on the lower end of the sleeve, $f$. It will be readily understood that when it is required to adjust the chandelier into any desired position, it is merely necessary to slack back one or other of the screwed studs, $f^2$, by any convenient means. $f^6$ represents a tube, into which the lower end of the tube, D, fits, as shown, and which slides up and down thereon. In order to make a perfectly tight joint between the inner tube, D, and the outer one, $f^6$, in addition to making one tube fit tightly over the other, I have devised a stuffing box which is more clearly illustrated in Fig. 5. It consists of an outer casing or tube, $f^7$, into the lower end of which is screwed the tube, $f^6$, while the upper end is closed by a screwed plug or otherwise. The lower half of this casing or tube, $f^7$, is filled with a series of leather washers, $f^8$, soaked in beeswax, while the upper part is filled or partially filled with a number of washers, $f^9$, made of a composition of glycerine and glue. A solid metal dividing piece, $f^{10}$, is formed inside the casing, $f^7$, so as to separate the washers, $f^9$, from the washers, $f^8$, and allow a variable or elastic pressure to be put upon the former. This is done by means of a spiral spring, $f^{11}$, encircling the tube, D, and fitting within a sliding cylinder, $f^{12}$, made so as to fit closely within the casing, $f^7$. By this means the kerosene or other liquid fuel will be effectually prevented from escaping between the two tubes, D $f^6$, while at the same time the chandelier can be raised and lowered in the ordinary manner. The lower end of the tube, $f^6$, as well as the sleeve, $f^4$, are screwed into a valve casing, $g$ (Fig. 4) through which is formed a hole, $g'$, in which is fitted a screw-threaded spindle, $g^2$, one end of which carries a valve, $g^3$, adapted to open or close the end of the hole, $g'$, where it leads into the passage, $g^4$, communicating with the pipe, $f^6$. $g^5$ represents a shield or casing which can be fitted down over the valve casing, g, in order to inclose same and form an ornamentation for the chandelier. From the hole, $g'$, extends a downward projecting tube, $c^6$, which passes into the reservoir, C, of the lamp. It is formed with a small hole to feed the oil or other liquid fuel into said reservoir at a very slow rate, and its end can be closed by means of a valve, $e'$, secured upon the float, E, and constructed and operating in the same way as the float and valve shown in Fig. 3. $e^2$ represents a guide rod which passes through the float, E, and is fitted into a hole in the lower part of the chandelier, as illustrated in the drawings. In order that the lower end of the discharge tube, $f^6$, of the chandelier may be opened or closed at will, when for instance it is desired to remove the oil reservoir and burners, I screw a sleeve, $e^3$, over the lower end of said tube, as illustrated in Fig. 6, and fit a piece of glycerine and glue composition, $e'$, in the lower part of the said sleeve, so that when it is required to remove the reservoir and burners of the chandelier all that is necessary is to turn this sleeve, $e^3$, so as to lift the valve, $e'$, against the lower end of the tube, $f^6$, and thus close it.

The valve illustrated in Fig. 7 is an equilibrium valve, and is intended to be used where there is a high pressure of liquid fuel. The lower end of tube, $f^6$, is secured, as shown, to a casing, $e^{30}$, from the inside of which a passage, $e^4$, leads down to the discharge opening of said valve. Through this discharge opening is passed a spindle, $e^5$, carrying a piston, $e^6$ (formed of glycerine, and glue) at its upper end and a weight, $e^7$, at its lower end. The upper part of this weight, $e^7$, is recessed as illustrated at $e^8$, and the recess is filled with some packing composition such as a mixture of glycerine and glue. The hole in which the piston, $e^6$, slides communicates through an air hole, $e^9$, with the atmosphere in order that the said piston may not be prevented by back pressure from being raised when the float, E, comes in contact with the weight, $e^7$. This piston, $e^6$, is so arranged that if the reservoir, and therefore the float, E, is removed from the chandelier or other apparatus in which this valve is fitted the weight, $e^7$, will pull the piston, $e^6$, down so as to close the opening at the bottom of the passage or channel, $e^4$, and thus prevent the oil or other liquid fuel leaking. When the reservoir and float are replaced in position, the float raises said piston to a sufficient height to leave a clear passage for the oil to pass, but should the oil rise above a certain level in the reservoir, the float, E, will lift the weight, $e^7$, and the piston, $e^6$, until the packing, $e^8$, is brought against the discharge opening of the valve, the effect of which will be to seal such opening and prevent any further escape of oil.

Figure 8:
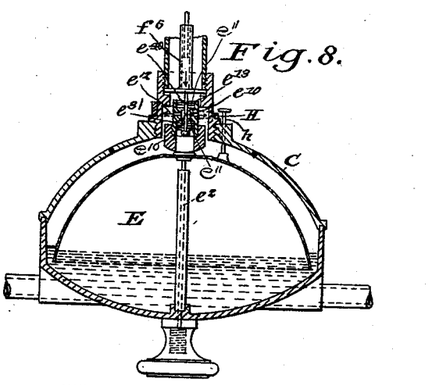

In the modified form of valve illustrated in Fig. 8 the casing, $e^{31}$, is arranged to slide up and down upon a piece of small tube, $e^{40}$, projecting down from the lower end of the tube, $f^6$. This small tube, $e^{40}$, is provided at its center with discharge openings, $e^{10}$, leading into a chamber, $e^{11}$, in the valve casing, from which chamber passages, $e^{12}$, lead out into the oil reservoir. Within the vertically sliding valve casing, $e^{31}$, above and below the chamber, $e^{11}$, I arrange pieces of packing material, $e^{13}$, which fit tightly around the tube, $e^{40}$, and effectually prevent the oil from passing from the chamber, $e^{11}$, other than through the passages, $e^{12}$. The valve casing is weighted, as shown, and its tendency is to fall. It is, however, normally held in position (shown in Fig. 8) by the float, E, but should more than the required amount of oil flow into reservoir, C, this float will raise said valve until the lower ring of packing material, $e^{13}$, passes over the holes, $e^{10}$, in the tube, $e^{40}$, and thus shuts off the supply. If the reservoir, C, and float, E, be removed, the opposite movement will take place; that is, the valve will fall until the upper packing ring, $e^{13}$, passes over the holes, $e^{10}$, and thereby closes them, when it will be prevented from further movement by a nut on the lower end of the tube, $e^{40}$. In order that this valve may be closed whenever required, as for instance for the purpose of effecting repairs, or in order to prevent the oil "creeping" when the burner is not in use for some time, I fit a cam ring, H, around the valve casing and form it with its upper surface inclined, so that if it is turned round, said inclined surface will pass underneath the head of a bolt or pin, $h$, projecting up from the float, E, and will therefore raise said float, the effect of which will be to also raise the valve, $e^{31}$, and thus cause it to close the openings, $e^{10}$, in the discharge pipe, $e^{40}$. By this means the flow of liquid into the reservoir, C, may be stopped at will, and at the same time a vacant space will be left under the float which will at once be filled with the oil contained in the burners, thus lowering the level of the oil in said burners until there is not sufficient oil for the wick to absorb. By turning the cam, H, back, the oil is at once forced into the burners. This contrivance can also be used with the various valves and floats herein described.

I sometimes construct the floats, E, as illustrated in Fig. 8; that is open at the bottom and spun out of a solid sheet of metal, instead of having a seam or joint about midway of their height. With this construction the air contained within the float, E, is compressed and thus makes the float buoyant, and it will of course be obvious that no liquid can enter the float above a certain height, as there will be no leakage through the float itself, owing to its being solid and made without joint or seam of any description. This construction saves considerable time and labor in manufacturing, as well as in testing floats. The guide rod, $e^2$, is in this arrangement shown as sliding within a sleeve projecting up from the bottom of the reservoir, C, which is in this, as in other cases, provided with an air hole to allow the kerosene to rise and fall as required.

The valve illustrated in Fig. 9 is of similar construction to that shown in Fig. 8, the difference being that the packing, $e^{13}$, is fitted around a groove in the tube, $e^{40}$, and passes through a valve casing, $e^{31}$, provided with a discharge opening, $e^{12}$, which when the float, E, is in its normal position comes opposite to a corresponding hole formed through the packing ring, $e^{13}$, and tube, $e^{40}$, thus providing a clear discharge for the liquid fuel to pass from the supply pipe, D, into the reservoir, C.

The valve illustrated in Fig. 10 is similar to that shown in Fig. 6, except that the sealing composition, $e'$, is contained within a small cup or receptacle, $e$, secured upon the float, E, and having an upwardly projecting sleeve, $e^{32}$, encircling the lower end of the tube, $f^6$. Around the lower end of the sleeve or outer casing, $f^4$, of the chandelier, I arrange a cam ring, H, so that it will act upon a pin, $h$, projecting from the sleeve, $e^{32}$, and when it is turned round will lift said sleeve, $e^{32}$, and therefore the valve, $e'$, against the discharge end of the tube, $f^6$, thus closing the orifice therein and stoping the flow of liquid fuel to the reservoir, C.

Figure 11:
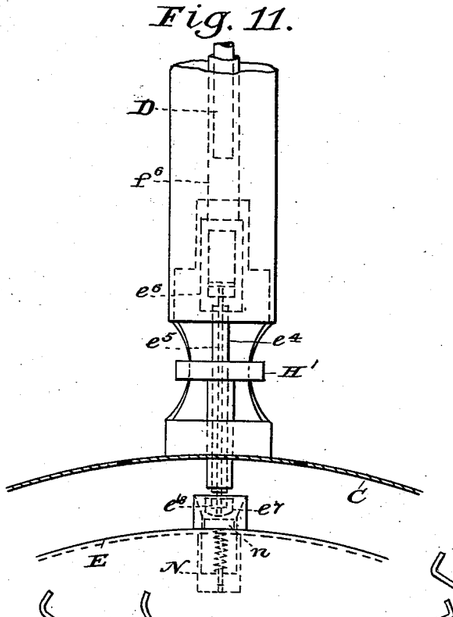
Figure 12:
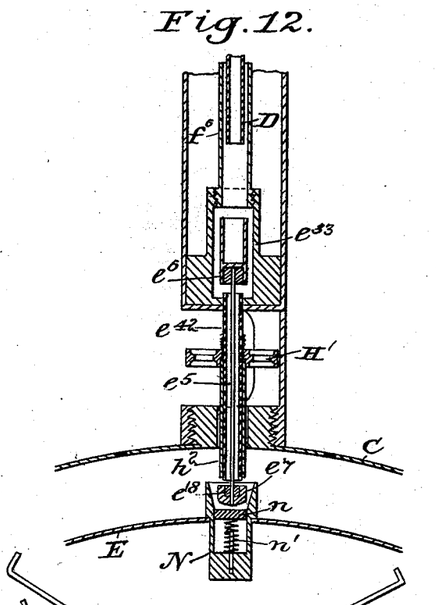

In the valve illustrated in Figs. 11 and 12 the outer tube, $f^6$, down which the liquid fuel passes, is screwed into a casing, $e^{33}$, which is formed with a chamber from which a tube, $e^{42}$, leads down into the reservoir, C. Through this tube passes a rod, $e^5$, carrying a valve, $e^6$, at its upper end and another valve, $e^7$, at its lower end. In this lower valve is inserted a piece of glycerine and glue composition, $e^{18}$, adapted to make a tight joint around the lower end of the tube, $e^{42}$. This said lower end of said tube is screw-threaded, as illustrated, and a sleeve, $h^2$, is fitted over it, the lower end of said sleeve being correspondingly threaded, so that when rotated it will move up and down the tube, $e^{43}$. The upper end of this sleeve, $h^2$, is provided with a small thumb wheel, H', so that when it is required to remove the float and other parts of the chandelier, and it is therefore necessary to prevent the oil from escaping, this small milled wheel, H', can be turned so as to cause the lower end of the sleeve, $h^2$, to project down beyond the lower end of the tube, $e^{42}$, until it bears against the valve, $e^8$, and forces it down, the effect being to draw the valve, $e^6$, down tightly upon the upper end of the tube, $e^{42}$, and thus prevent the escape of fuel therethrough. Upon the float, E, I arrange a short cylinder, N, in which works a piston, $n$, which is normally kept in its raised position by a spiral spring, $n'$, fitted between it and the bottom of said cylinder, N. This spring, when the valve, $e^6$, is drawn down by means of the milled wheel, H', will be compressed, unless the float, E, has been previously removed, and the effect will be when said float is replaced that this spring will tend to raise said valve, $e^6$, and again open communication from the pipe, $f^6$, into the reservoir, C. This spring arrangement upon the float can be used if desired with some of the other arrangements of valves (as illustrated by way of example in Fig. 16$^a$) in order to raise them off their seats when it is required to again open communication into the reservoir of the lamp; also with the cam, H, to raise the float and prevent creeping as described in Fig. 8.

Figures 13, 14, 15:
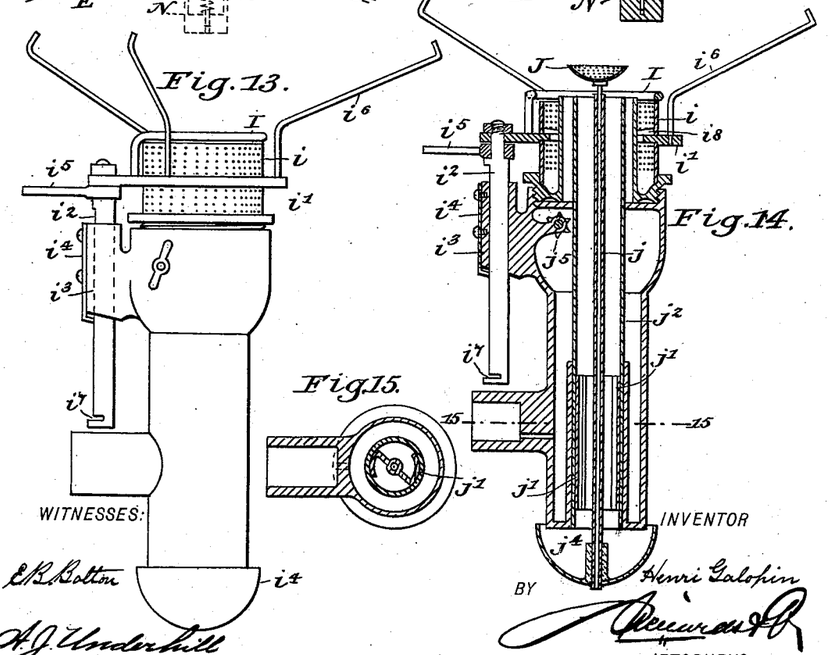

The lamp glass chimney holder which I have invented consists of a piece of stout wire or rod, I, bent round so as to encircle the lower end of the lamp chimney, and having a piece of perforated sheet metal or wire gauze, $i$, projecting up from the base plate, $i'$, to which said bent wire, I, is riveted or otherwise secured, as shown. This base plate, $i'$, is bolted or otherwise secured to the upper end of a bar or rod, $i^2$, passing through an opening, $i^3$, formed in a lug projecting from the side of the lamp burner. Upon this lug is secured a flat spring, $i^4$, the lower end of which bears against a flat on the rod, $i^2$, and thus always tends to hold it in position. The upper end of this said rod is also provided with a small projecting handle, $i^5$, whereby said rod may be raised and turned round, carrying with it the base plate, $i'$, and the lamp glass holder, I, piece of gauze, $i$, and the usual globe or shade holder, $i^6$, up to above the level of the top of the wick, when said rod, $i^2$, can be turned round so as to swing the glass chimney and globe clear of the wick to enable said wick to be trimmed or otherwise attended to. When the rod, $i^2$, is turned round in the manner just described, the lower end of the spring, $i^4$, is arranged to fit into a recess, $i^7$, in the lower end of said rod, so as to keep it in its raised position. On the base plate, $i'$, are three projecting pieces, $i^8$, for preventing the lamp glass from touching the base plate, thus leaving a passage for the air, which is better regulated by a piece of perforated metal or gauze secured on the base plate and fitting around glass chimney. This use of air from an upper gallery as well as from the ordinary gallery allows of a longer and whiter flame before smoking. Above the top of the wick I arrange a small baffle plate, J, made of perforated sheet metal, gauze, or other suitable material, in order to better distribute the air to the interior of the circular flame. This baffle plate is carried on the upper end of a tube, $j$, the lower end of which is formed with two Z-shaped wings, $j'$, which are arranged to spring closely within the wick tube, $f^2$—that is, within the tube around which the wick is fitted, the objects being to permit of its easy removal in order to clean the air passage of wick tube, and avoid the fitting part from marking the flame. The lower end of the tube, $j$, is screwed into an ornamental cup or receptacle, $j^4$, which serves to catch the charred pieces of wick falling out of the wick tube, $j^2$.

$j^5$ represents the pinion which is arranged to engage with the wick to enable it to be raised or lowered. I prefer that said pinion should engage directly with the wick without employing a rack or holder to carry it.

Figure 16:
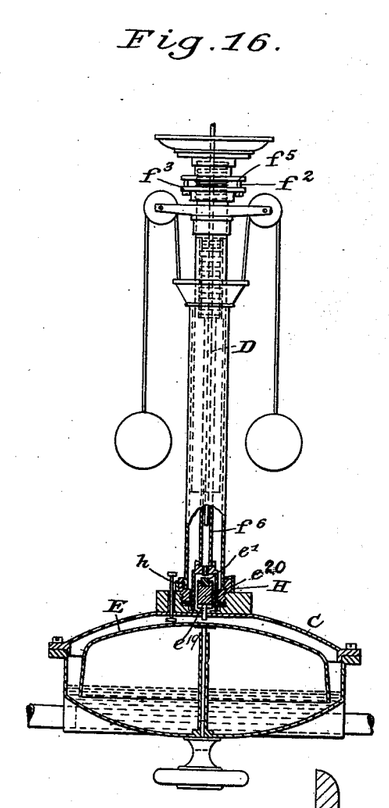
Fig. 16 is a sectional elevation of a chandelier, embodying various other improvements that I have devised.

The construction of lamp burner and chimney holder, &c., which I have just described, is applicable to either bracket, standard or ordinary lamps, chandeliers, or other burners. The chandelier illustrated in Fig. 16 is similar to that shown in Fig. 4, the only difference being that the coupling connecting it to the service pipe or fixed support around said service pipe is somewhat different, ordinary set screws, $f^2$, being used to obtain the horizontal adjustment required, and the flange, $f^3$, being screwed upon a socket piece, which is screwed into the flanged piece, $f^5$, sufficient play being left between the screw threads to allow the chandelier to be brought into its horizontal position. The construction of the stuffing box around the service pipe, D, is the same as before, and the float, E, is constructed in the same manner as illustrated in Fig. 8. The valve for closing the lower end of the tube, $f^6$, consists of a heavy piston, $e^{20}$, carrying a block or washer, $e'$, of glycerine and glue at its upper end, and having a washer, $e^{19}$, of similar material around its lower end, the effect if the float, E, is removed being that said weighted piston will fall and the washer, $e^{19}$, on its lower end will close the opening leading into the reservoir, C, whereas normally said float raises said valve until sufficient liquid is passed into the reservoir, C, to lift it above a certain height so as to press the block of composition, $e'$, against the end of the tube, $f^6$, thus effectually closing it. The cam ring, H, as before, acts upon the head of the rod, $h$, and so lifts the float, E, and enables the valve to be closed when desired, as above described.

Figure 17:
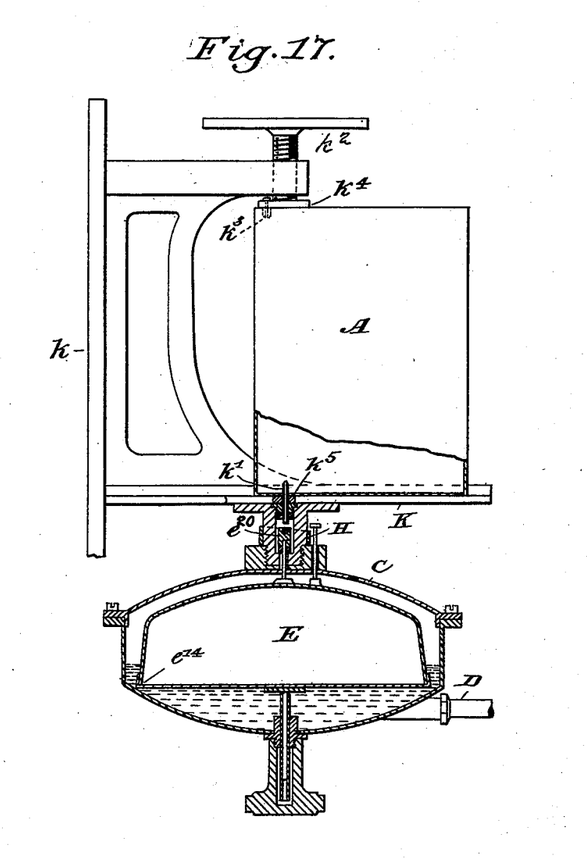
Fig. 17 is a sectional elevation showing an arrangement whereby kerosene tins may be conveniently utilized as main reservoirs.
Figure 18:
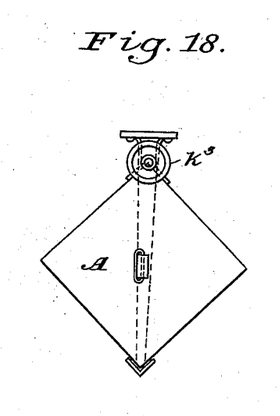
Fig. 18 is a plan of the apparatus illustrated in Fig. 17, but drawn to a much smaller scale.

Sometimes I arrange a kerosene tin, as illustrated in Figs. 17 and 18, that is, I take an ordinary kerosene tin and place it upon a bracket, K, projecting from a strong wall plate, $k$, in such a position as that a pointed tube, $k'$, will press against the under side of one corner of the tin. I then screw down the spindle, $k^2$, so as to force said tin down upon said pointed tube, $k'$, and thus cause said tube to pierce the bottom of the tin. $k^3$ represents another small pointed tube which is fixed to a plate, $k^4$, on the lower end of the screw-threaded spindle or rod, $k^2$, so that when said rod is pressed down it will pierce the top of the tin, A, and thus allow air to enter and take the place of the liquid fuel issuing therefrom. By this means ordinary kerosene tins can be connected to the main service pipe in an easy and expeditious manner, and the necessity is obviated for pumping from the tins into a main reservoir, the cost of which latter is also of course saved. The washer, $k^5$, of glycerine and glue is fitted around the tube, $k'$, to make a tight joint around the bottom of the tin, A, when said tube is passed through it.

In cases where all the burners to be supplied from the reservoir are on the same level, it is merely necessary to employ one float, E, for regulating the supply of liquid fuel to the whole of the burners. In this case it may be fitted immediately underneath the tin, A, as illustrated in Fig. 17, the main service pipe, D, leading from the reservoir to the different burners. An automatic valve, $e^{20}$ of similar construction to that shown in Fig. 16 may be used in connection with the float, E, to regulate the supply into the reservoir, C, and a cam ring, H, can also be arranged as hereinbefore described to enable said valve to be closed at will. The float, E, shown in this figure is formed with a seam, $e^{14}$, around its lower edge, the whole of the upper part of the float being spun out of one solid sheet of metal. By this means even should the seam, $e^{14}$, not be quite oil-tight, the liquid will only rise within the float, E, to a slight extent because of the air therein, and thus its buoyancy will not be materially interfered with.

If preferred, in order that the kerosene tin shown in Fig. 17 may be connected to the end of the service pipe instead of to the reservoir, C, I provide a screwed coupling ring, $e^{15}$, as illustrated in Fig. 17$^a$, so that said reservoir can be disconnected, and the main supply pipe substituted.

Figure 19:
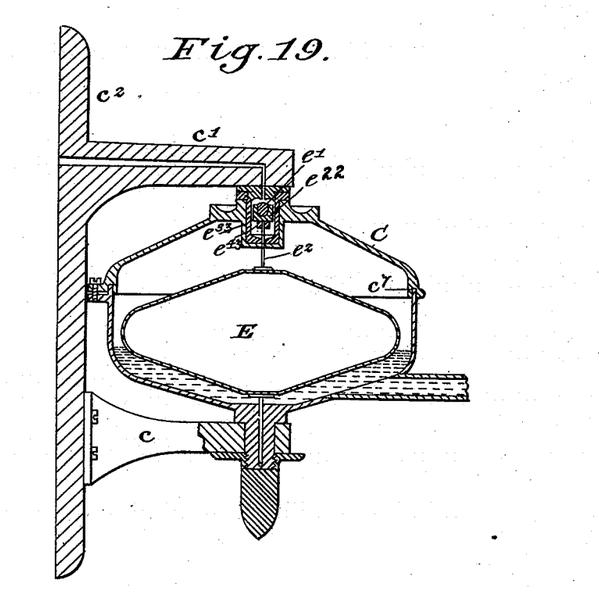
Fig. 19 is a sectional elevation of a bracket lamp, including a modified construction of automatic regulating valve.
Figure 20:
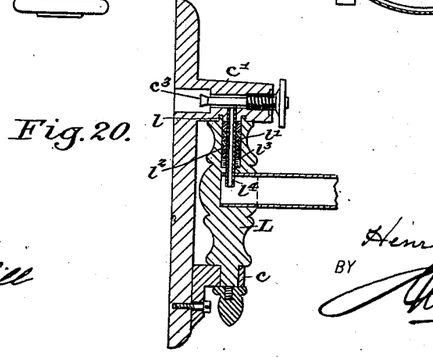
Fig. 20 is a vertical central section of an arrangement of bracket lamp which I employ where several lamps can be worked from one level.

Referring to Fig. 19, the oil reservoir, C, of bracket lamps may sometimes be supported as shown in this figure, that is between two brackets, $c$—$c'$, projecting from a wall plate, $c^2$, the lower bracket being removable from said wall plate to allow the reservoir, C, to be taken away when required. The valve shown in this figure consists of a piston, $e^{22}$, formed with a recess at its upper end, which is filled with a piece of glycerine and glue composition, $e'$, and having a guide pin, $e^2$, passing down through the casing, $e^{33}$, a washer, $e^{43}$, of glycerine and glue composition being fitted around said rod below the piston, $e^{22}$, so that when said piston is allowed to fall, that is, when the float E is removed, it will make a tight joint, and close the bottom of the valve casing, $e^{33}$. This latter fits tightly within a recess formed for the purpose in the upper part of the reservoir, C, as shown. In order to make a tight joint between the two halves of the reservoir, C, I fit a ring of glycerine and glue composition, $c^7$, within a groove in the edge of one of said halves, and I construct the adjacent edge of the opposite half so that it fits within said groove, and bears against said washer, thereby, when it is tightened up, forming a perfectly tight joint, as will be well understood. Where a number of burners are arranged upon the same level, and can therefore be worked by the same float and automatic valve, such as that illustrated in Fig. 17, I prefer to construct the bracket lamps, as illustrated in Fig. 20, that is, with the pivot piece, L, supported by the lower projecting bracket, $c$, and formed with an annular projection, $l$, fitting into a corresponding groove in the upper bracket, $c'$, in which groove is fitted a washer against which said annular projection, $l$, bears so as to make a perfectly tight joint. The upper end of this pivot piece, L, is formed with a recess, $l'$, in which are fitted a number of glycerine and glue washers, $l^2$, against which bears a hollow piston, $l^3$, fitted with a spiral spring, whereby a steady pressure is maintained against said washers so as to form a tight joint around the tube, $l^4$, which conducts the liquid fuel into the main pipe of the bracket. A stop valve, $c^3$, of similar construction to that shown in Fig. 3 is also provided to enable the supply to be cut off when it is desired to remove the bracket for any purpose.

Figure 21:
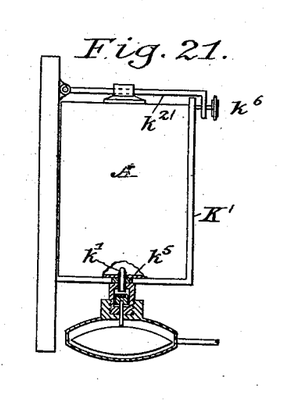
Fig. 21 is a sectional elevation of a kerosene tin fitted within a receptacle and connected with the main service pipe.

If preferred, the tins of kerosene to be used as oil reservoirs may be dropped, as illustrated in Fig. 21, into a receptacle, $K'$, in the lower end of which is arranged a tube, $k'$, around which is fitted a washer, $k^5$, and below which is an automatic stop valve, float, and oil reservoir of similar construction to that shown in Fig. 17. Over the receptacle, $K'$, is arranged a lever, $p^{21}$, which can be drawn down so as to press upon the kerosene tin, A, and thus force the pointed tube, $k'$, to pierce the bottom thereof. The lever, $p^{21}$, may be secured in its depressed position by means of a set screw, $k^6$.

Figure 22:
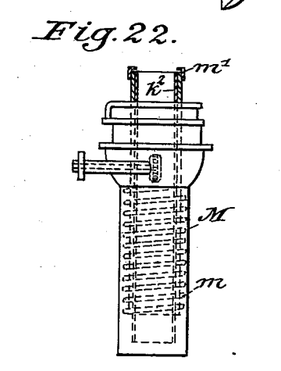
Fig. 22 is a side elevation, and Fig. 23 a vertical central section of a wick holder or burner which I have devised, together with a contrivance for preventing the wick being raised too high.
Figure 23:
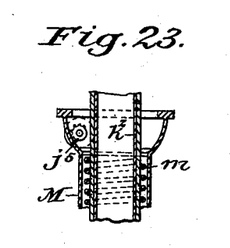
Figure 24:
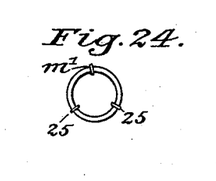
Fig. 24 is a plan of the upper part of a wick.
Figure 25:
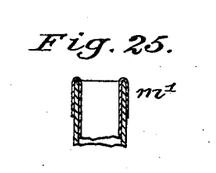
Fig. 25 is a vertical section (on line 25—25, Fig. 24) of another contrivance which I sometimes use for insuring only the required amount of wick being exposed.

Sometimes I arrange the wick of the lamp burners, as illustrated in Figs. 22 and 23; that is, so that they fit moderately tight around the wick tube, $j^2$, but are free to slide thereon, and I connect the lower ends of said wicks to a spiral spring, M, whose upper end is secured to a collar, $m$, fitting within the upper part of the oil reservoir, the effect being to keep the spring, M, always in tension, so that it tends to raise the wick. It is prevented doing so beyond a certain extent by small pieces, $m'$, projecting over the wick in one or more places. Figs. 24 and 25 show another way of keeping the wick from being raised too high by fitting round the wick loosely an annular piece of metal with one or more bridge pieces, $m'$, the distance between the bridge pieces and the annular surface being the required length of wick to be exposed to feed the flame. The pinion, $j^5$, engaging with the wick is formed with teeth around about one-half of its diameter, as illustrated in Fig. 23, the other half being plain, as shown. When it is required to light the lamp this pinion is turned back, so that its plain portion is against the wick. It is thus freed, and will be raised by the spiral spring, M. Should it be required to lower the wick, this pinion is turned round until its teeth engage with said wick and push it down in the ordinary manner. By this means one half-turn is sufficient to insure the wick being raised to the required height, which will be regulated by the stop-pieces, $m'$, as will be well understood.

Having now particularly described and ascertained the nature of my said invention and in what manner the same is to be performed, I declare that what I claim is—

1. In apparatus for using liquid fuel for lighting and heating purposes, a screw-threaded spindle formed with channels or grooves (such as $b^6$) and having a pointed end (such as B) adapted to be forced through a piece of thin metal let into the side of the kerosene tin or reservoir from which the supply of kerosene is to be obtained, the other end of said spindle being provided with a hand wheel, and the casing of said spindle having an air pipe (such as $b^4$) extending up to above the fuel in the tin or reservoir, substantially as and for the purposes herein described.

2. In apparatus for using liquid fuel for lighting and heating purposes, a stuffing box in a chandelier, consisting of a sleeve or tube (such as $f^7$) fitted with a series of leather or other washers (such as $f^8$) in one half, and with a series of washers formed of glycerine and glue pressed closely together by means of a spiral spring (such as $f^{11}$) in the other half, the two said halves being divided by a metal dividing piece (such as $f^{10}$) inside said sleeve, the whole being constructed substantially as and for the purposes herein described.

3. In apparatus for using liquid fuel for lighting and heating purposes, the employment of a valve, having its seating or sealing part made of a composition of glycerine and glue, inclosed or surrounded by an envelope of oilskin, substantially as and for the purposes herein described.

4. In apparatus for using liquid fuel for lighting and heating purposes, the combination with an oil reservoir (such as C) of a float (such as E) carrying a valve (such as $e$), adapted to open or close the delivery pipe or opening leading into said reservoir, said valve being arranged to be operated by a partial rise of the float, to be closed by a full movement of the float and to be closed, when the float is removed.

5. In apparatus for using liquid fuel for lighting and heating purposes, a bracket (such as K) fitted with a short upwardly projecting pointed tube (such as $k'$), in combination with means such as the screw-threaded rod $k^2$ for forcing a kerosene tin down upon said pointed tube and also for opening an air hole by pressing down the point of a tube (such as $k^3$) connected to the hand screw, substantially as and for the purposes herein described.

In witness whereof I have hereunto set my hand in presence of two witnesses.

HENRI GALOPIN.

Witnesses:
WALTER SMYTHE BAYSTON,
WILLIAM GUEST HOLDEN.